(12) United States Patent
Chuang

(10) Patent No.: US 6,820,842 B1
(45) Date of Patent: Nov. 23, 2004

(54) TELESCOPIC SUPPORT

(76) Inventor: Louis Chuang, 7F-8, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 10/427,641

(22) Filed: May 1, 2003

(51) Int. Cl.[7] .................................................. A47F 5/00
(52) U.S. Cl. ...................... 245/125.8; 248/127; 248/158
(58) Field of Search .................. 297/344.18; 403/109.5, 403/109.6; 248/125.8, 127, 158, 161, 404, 407, 408

(56) References Cited

U.S. PATENT DOCUMENTS

| | | | | |
|---|---|---|---|---|
| 1,581,463 A | * | 4/1926 | Moors | 211/207 |
| 2,974,931 A | * | 3/1961 | Reel et al. | 410/128 |
| 3,327,985 A | * | 6/1967 | Levit | 248/408 |
| 3,443,784 A | * | 5/1969 | Walkinshaw | 248/408 |
| 3,522,658 A | * | 8/1970 | Howell | 33/528 |
| 4,023,649 A | * | 5/1977 | Wood | 187/206 |
| 4,083,530 A | * | 4/1978 | Linnepe | 254/95 |
| 4,360,283 A | * | 11/1982 | Psotta | 403/104 |
| 4,434,970 A | * | 3/1984 | Boland et al. | 254/108 |
| 4,655,426 A | * | 4/1987 | von Dulong et al. | 248/405 |
| 6,042,066 A | * | 3/2000 | Maharg et al. | 248/200.1 |
| 6,305,869 B1 | * | 10/2001 | Chen | 403/109.5 |
| 6,371,422 B1 | * | 4/2002 | St. Martin et al. | 248/200.1 |
| 6,467,741 B1 | * | 10/2002 | Shih | 248/200.1 |
| 6,698,698 B1 | * | 3/2004 | Hsieh | 248/125.8 |

* cited by examiner

*Primary Examiner*—Anita King
*Assistant Examiner*—Amy J. Sterling
(74) *Attorney, Agent, or Firm*—Alan D. Kamrath; Nikolai & Mersereau, P.A.

(57) ABSTRACT

A telescopic support includes an external tube, an internal tube inserted in the external tube and an extending device for extending the external tube and the internal tube. The extending device may include a collar mounted on the external tube and a cam mounted on the collar between a first position for releasing the internal tube and a second position for pushing the internal tube.

20 Claims, 8 Drawing Sheets

TELESCOPIC SUPPORT

FIELD OF INVENTION

The present invention relates to a telescopic support.

BACKGROUND OF INVENTION

Taiwanese Patent Publication No. 457922 discloses a telescopic support consisting of two telescopic elements. Each of the telescopic elements includes an external tube 20, an internal tube 30, a spring 22, a plug 23 and a sucking disc 40. The external tube 20 includes a first end 21 that is reduced and a second end. The internal tube 30 includes a first end 31 that is enlarged and a second end. The internal tube 30 is inserted in the external tube 20. The first end 31 of the internal tube 30 abuts the first end 21 of the external tube 20 so as to keep the internal tube 30 connected with the external tube 20. The spring 22 is put in the external tube 20, and the plug 23 is fit in the second end of the external tube 20 so that the spring 22 pushes the internal tube 30 from the external tube 20. The sucking disc 40 is attached to the second end of the external tube 20. The second end of the internal tube 30 of one of the telescopic elements is enlarged (32) in order to receive the second end of the internal tube 30 of the other of the telescopic elements in use. The sucking discs 40 contact two walls so as to suspend the telescopic support. The springs 22 are essential in keeping the telescopic support suspended. If the springs 22 are weak, the telescopic support falls easily when bearing a load. If the springs 22 are strong, the telescopic support is operated with difficulty.

The present invention is therefore intended to obviate or at least alleviate the problems encountered in the prior art.

SUMMARY OF INVENTION

It is the primary objective of the present invention to provide a secure and easily operable telescopic support.

According to the present invention, a telescopic support includes an external tube, an internal tube inserted in the external tube and an extending device for extending the external tube and the internal tube.

The extending device may include a collar mounted on the external tube and a cam mounted on the collar between a first position for releasing the internal tube and a second position for pushing the internal tube.

Other objectives, advantages, and novel features of the invention will become more apparent from the following detailed description when taken in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
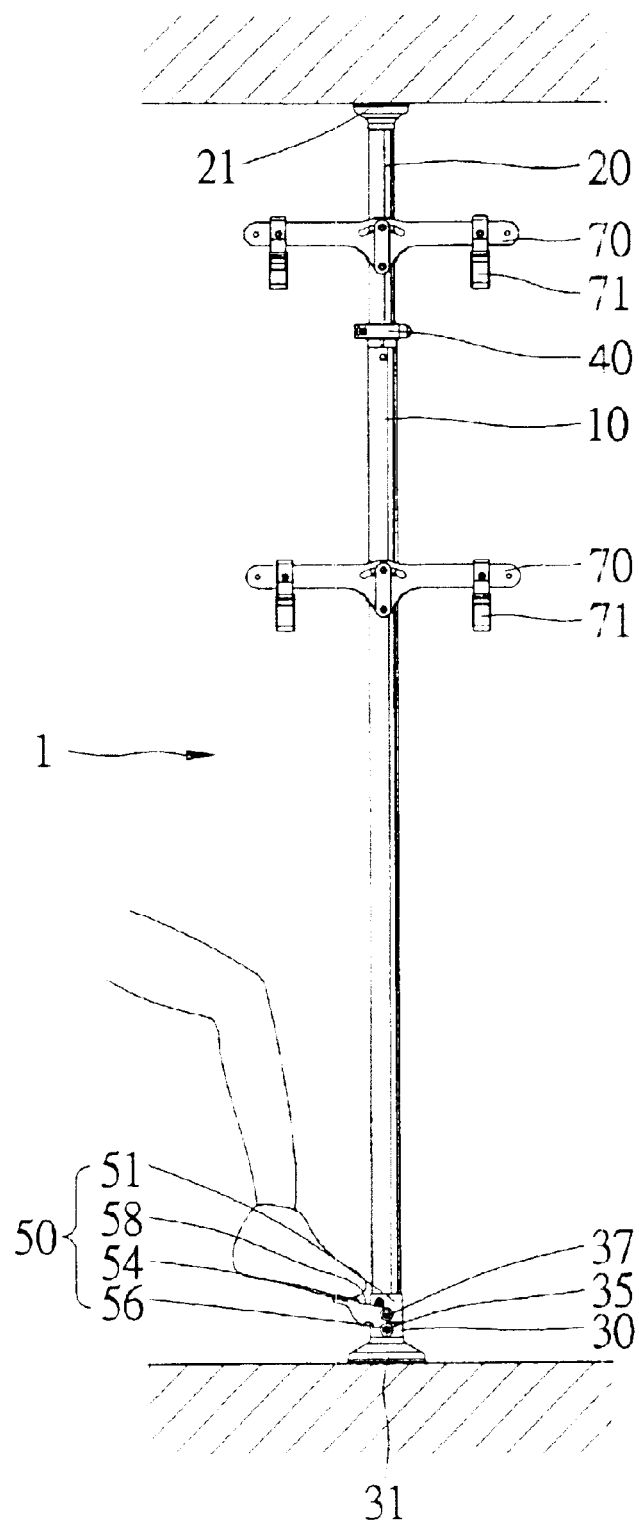
FIG. 1 is a front view of a telescopic support according to the preferred embodiment of the present invention.
Figure 2:
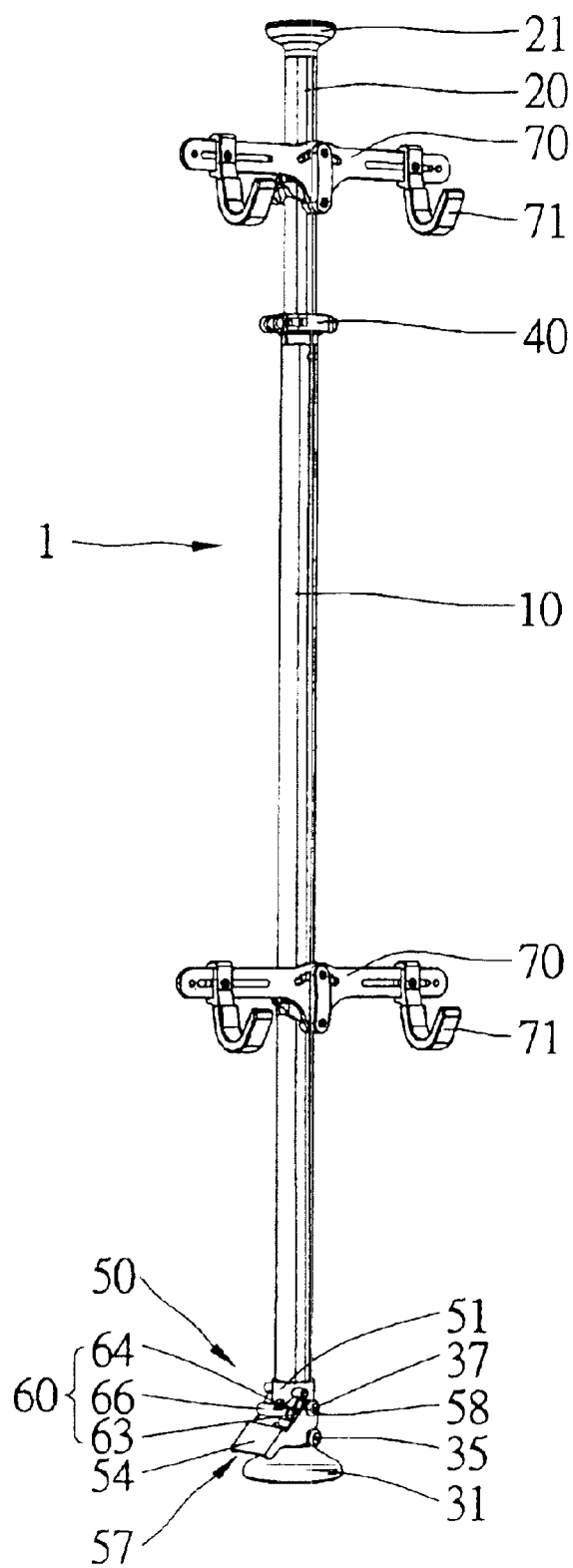
FIG. 2 is a perspective view of the telescopic support of FIG. 1.
Figure 8:
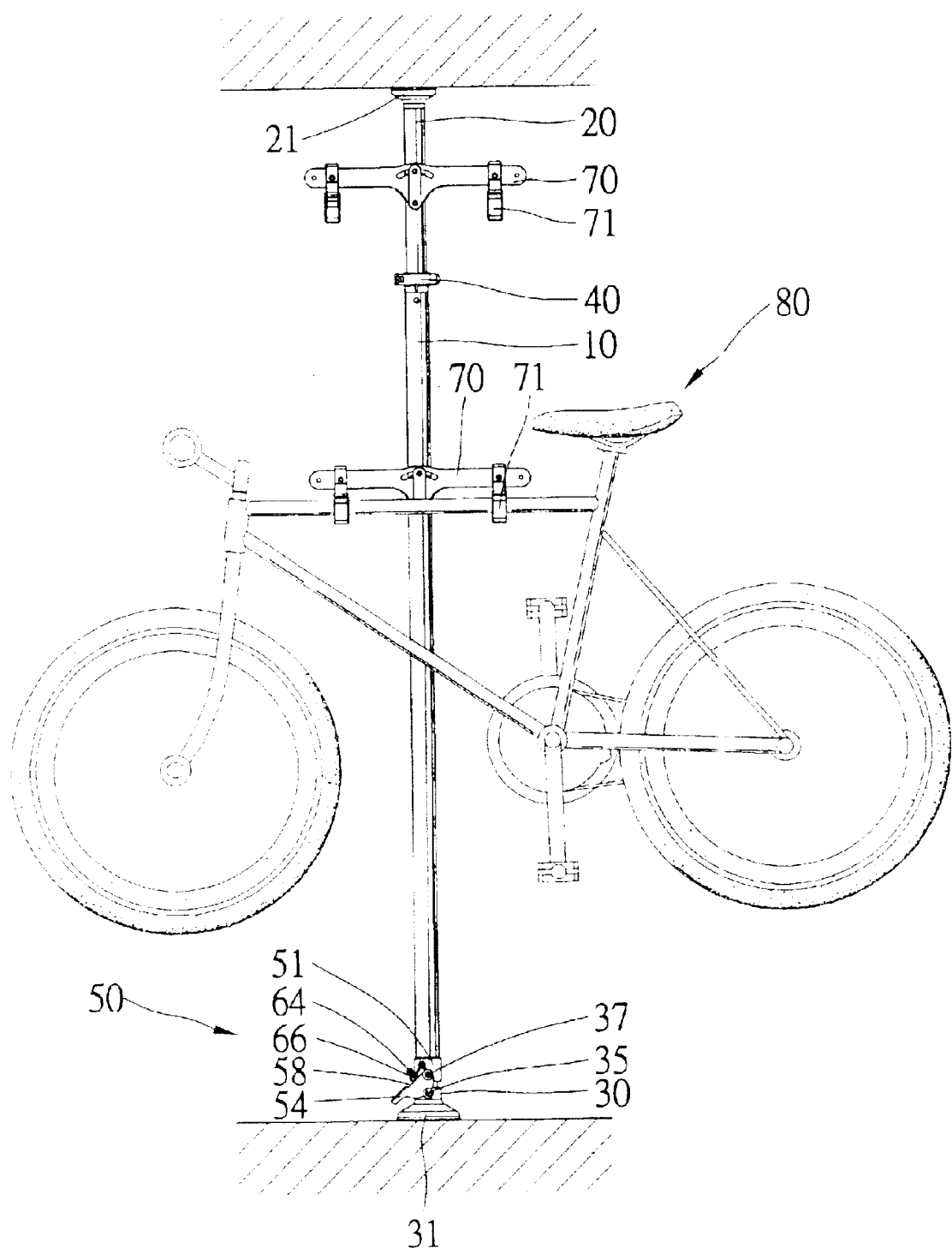
FIG. 8 is similar to FIG. 1 but showing the telescopic support bearing a bicycle.

Referring to FIGS. 1 and 2, according to the preferred embodiment of the present invention, a telescopic support 1 includes a first tube 10, a second tube 20 telescopically inserted in the first tube 10, a third tube 30 telescopically inserted in the first tube 10, a retainer 40 for retaining the second tube 20 in position relative to the first tube 10, an extending device 50 for extending the third tube 30 relative to the first tube 10, a locking device 60 for locking the extending device 50 and several hangers 70 mounted on the first tube 10 and/or the second tube 20. An end element 21 is attached to an end of the second tube 20 for contact with a surface such as a ceiling. An end element 31 is attached to an end of the third tube 30 for contact with a surface such as a floor. On each of the hangers 70 are mounted several hooks 71 for carrying a load such as a bicycle 80 as shown in FIG. 8.

Figure 3:
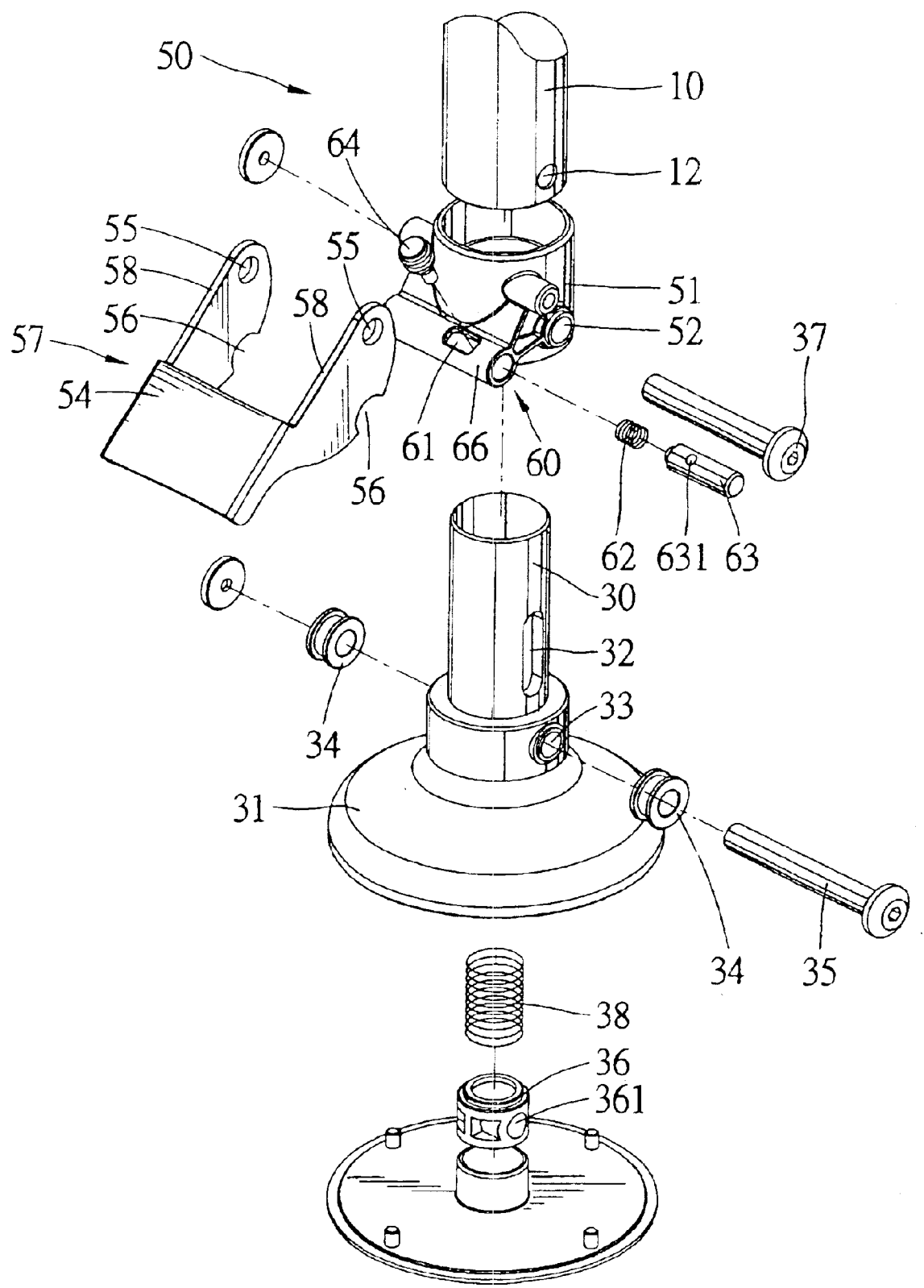
FIG. 3 is an exploded view of an extending device used in the telescopic support of FIG. 2.

Referring to FIG. 3, the first tube 10 defines two apertures 12 near its lower end.

The third tube 30 includes a closed upper end and an open lower end. The third tube 30 defines two slots 32 and two apertures 33 as well. Two wheels 34 are mounted on an axle 35 inserted in the apertures 33. The wheels 34 are in the form of a pulley in the preferred embodiment.

A limit 36 defines an aperture 361.

The extending device 50 consists of a collar 51 and a cam assembly 57. The collar 51 defines two apertures 52. The cam assembly 57 includes a pedal 54 and two cams 58 extending from the pedal 54. Each of the cams 58 defines an aperture 55 and a recess 56. The pedal 54 may be replaced with a grip in an alternative embodiment.

During assembly, the lower end of the first tube 10 is inserted in the collar 51. The collar 51 is put between the cams 58. A spring 38 and the limit 36 are put in the third tube 30. A pin 37 is inserted in the apertures 55, 52 and 12 and the slots 32 and the aperture 361. Thus, the collar 51 is secured to the first tube 10. The cam assembly 57 is pivotally mounted on the collar 51. The third tube 30 is inserted in the first tube 10. The limit 36 is secured to the first tube 10. The spring 38 is compressed between the limit 36 and the closed upper end of the third tube 30, thus pushing the third tube 30 into the first tube 10.

The locking device 60 includes a tube 66, a spring 62, a rod 63 and a handle 64. The tube 66 is secured to the collar 51. The tube 66 defines a slot 61. The spring 62 is put in the tube 66. The rod 63 is inserted in the tube 66. The rod 63 defines a hole 631 aligned with the slot 61. The handle 64 includes a tip fit in the hole 631. Thus, a user can move the rod 63 via operating the handle 64.

Figure 4:
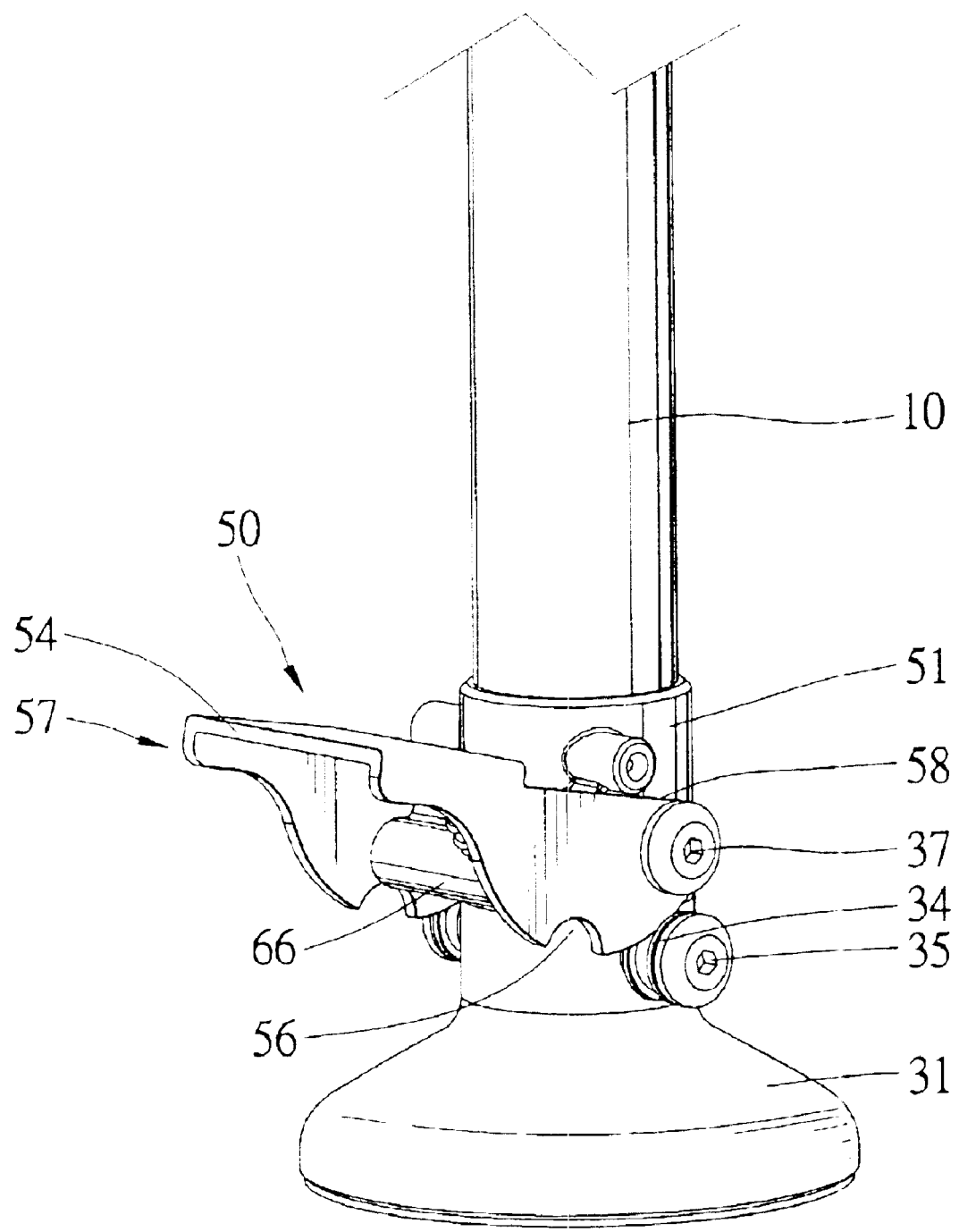
FIG. 4 is a perspective view of the extending device of FIG. 3.
Figure 5:
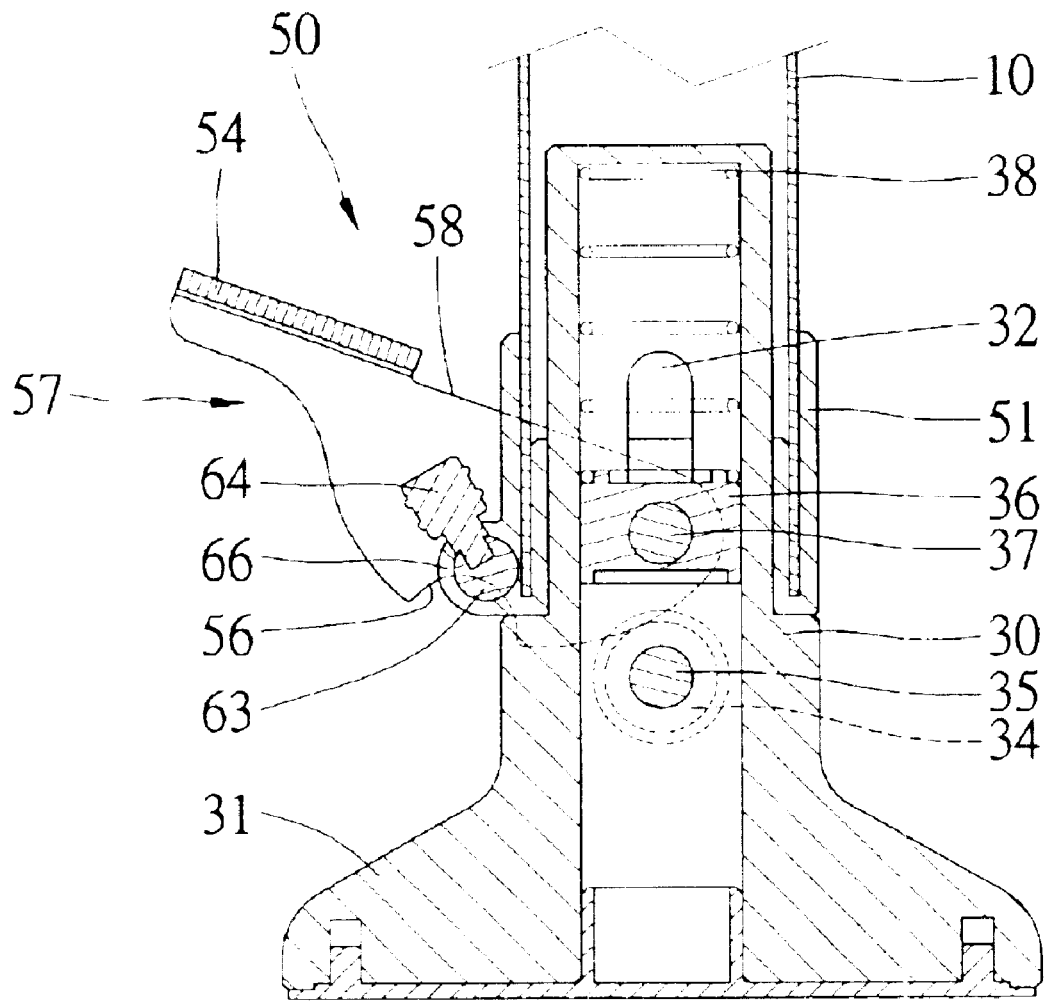
FIG. 5 is a cross-sectional view of the extending device of FIG. 4.

Referring to FIGS. 4 and 5, the cam assembly 57 is in a first position where the cams 58 are not in engagement with the wheels 34, thus allowing the spring 38 to push the third tube 30 into the first tube 10.

Figure 6:
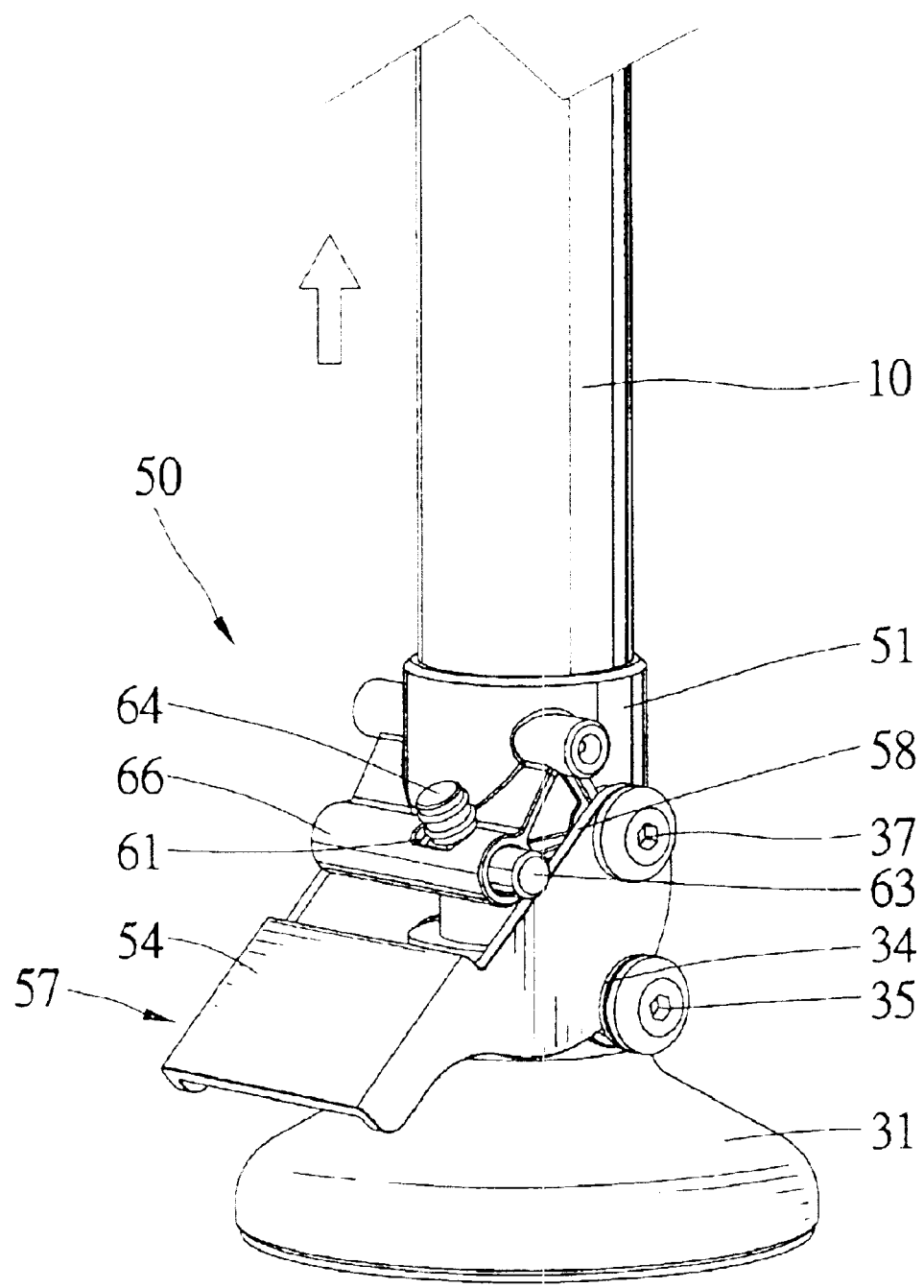
FIG. 6 is similar to FIG. 4 but showing the extending device in another position.
Figure 7:
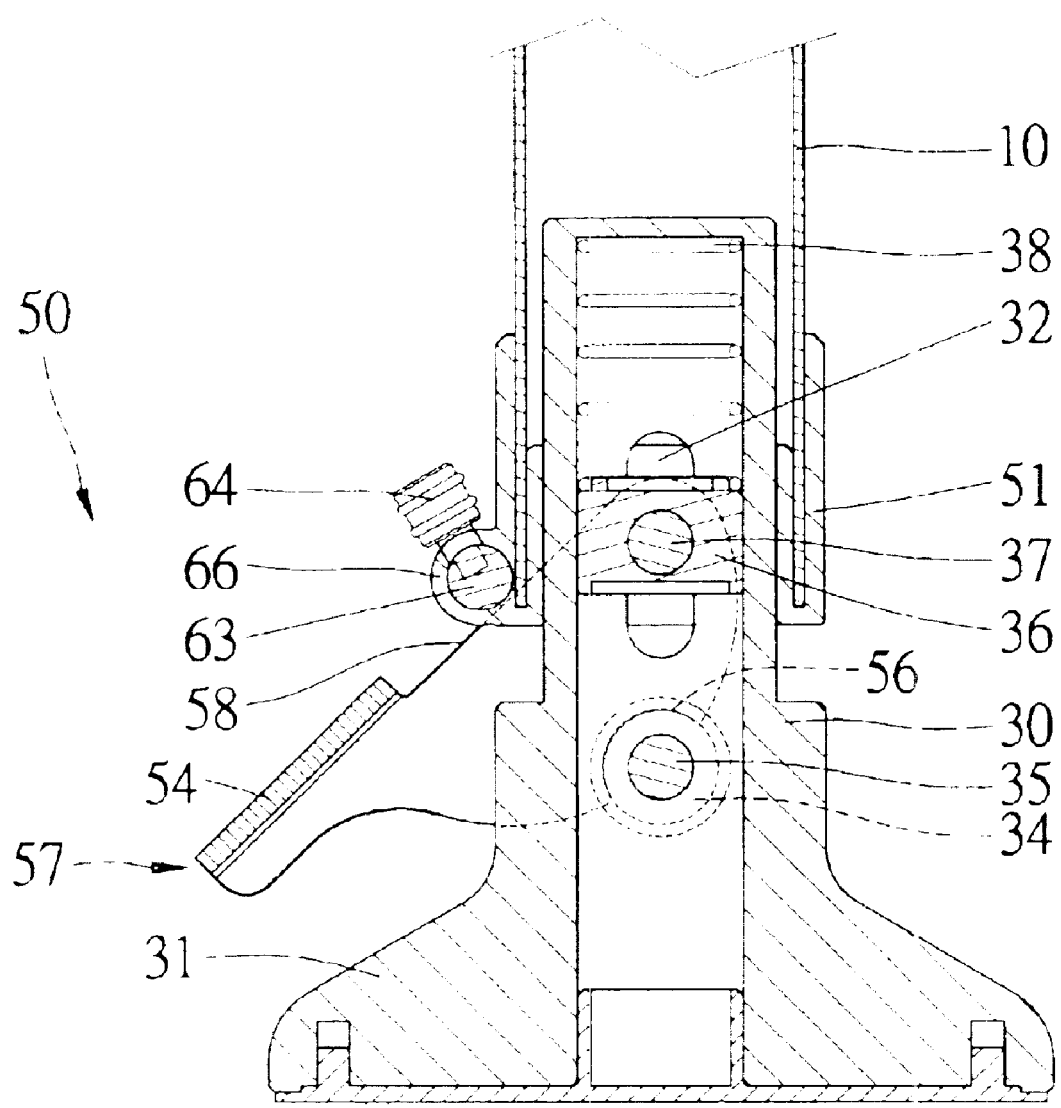
FIG. 7 is a cross-sectional view of the extending device of FIG. 6.

Referring to FIGS. 6 and 7, the pedal 54 is trodden so as to pivot the cam assembly 57 from the first position to a second position. During the pivoting of the cam assembly 57, the cams 58 are in engagement with the wheels 34, thus pushing the third tube 30 from the first tube 10. Therefore, the first tube 10 and the third tube 30 are extended. The wheels 34 enter the recesses 56 so as to retain the cam assembly 57 in the second position. An end of the rod 63 is moved from the tube 66 for limiting one of the cams 58, thus locking the cam assembly 57 in the second position.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A telescopic support including:

an external tube;

an internal tube inserted in the external tube; and an extending device including a collar mounted on the external tube, a cam mounted on the collar for pushing the internal tube relative to the external tube and a pedal connected with the cam, wherein the extending device includes a wheel mounted on the internal tube for engagement with the cam, with the internal tube inserted into the external tube being vertically arranged, with the internal tube including an end element adapted to encase a floor, with the external tube extending vertically above the internal tube opposite to the end element, with the aperture defined in a lower end of the external tube, with the pedal located adjacent the end element of the internal tube to be stepped upon to telescope the external tube relative to the internal tube.

2. The telescopic support according to claim 1 wherein the cam defines a recess for receiving the wheel.

3. The telescopic support according to claim 1 wherein the wheel is a pulley.

4. The telescopic support according to claim 1 wherein the extending device includes an axle mounted on the internal tube, and the wheel is mounted on the axle.

5. The telescopic support according to claim 1 wherein the extending device includes a pin inserted in an aperture defined in the external tube, an aperture defined in the collar and an aperture defined in the cam.

6. A telescopic support including:

an external tube;

an internal tube inserted in the external tube; and an extending device including a collar mounted on the external tube, a cam mounted on the collar for pushing the internal tube relative to the external tube and a pedal connected with the cam, wherein the extending device includes a pin inserted in an aperture defined in the external tube, an aperture defined in the collar and an aperture defined in the cam, wherein the internal tube defines a slot through which the pin extends.

7. The telescopic support according to claim 6 including a spring between a closed end of the internal tube and the pin.

8. The telescopic support according to claim 7 including a limit mounted on the pin for contact with the spring.

9. The telescopic support according to claim 7 wherein the pin is inserted in an aperture defined in the limit.

10. The telescopic support according to claim 1 including a locking device for locking the cam.

11. A telescopic support including:

an external tube;

an internal tube inserted in the external tube;

an extending device including a collar mounted on the external tube, a cam mounted on the collar for pushing the internal tube relative to the external tube and a pedal connected with the cam; and a locking device for locking the cam, wherein the locking device includes a rod movably mounted on the collar between a releasing position for releasing the cam and a locking position for locking the cam, with the rod abutting the cam in the locking position and being in a noninterfering position with the cam in the releasing position.

12. The telescopic support according to claim 11 wherein the locking device includes a handle connected with the rod.

13. The telescopic support according to claim 11 wherein the locking device includes a tube secured to the collar in order to slideably receive the rod, with the cam movable relative to the tube, with the cam pivotally mounted to the collar about a pivot axis, with the rod being slideable in a slide direction parallel to and spaced from the pivot axis.

14. The telescopic support according to claim 13 wherein the locking device includes a handle connected with the rod generally perpendicular to the slide direction.

15. The telescopic support according to claim 14 wherein the tube defines a slot through which the handle extends.

16. The telescopic support according to claim 15 wherein the rod defines a hole for receiving a tip of the handle, with the handle abutting with the slot for preventing removal of the rod from the tube.

17. The telescopic support according to claim 1 including a locking device for locking the cam, wherein the locking device includes a rod movably mounted on the collar between a releasing position for releasing the cam and a locking position for locking the cam, with the rod abutting the cam in the locking position and being in a noninterfering position with the cam in the position.

18. The telescopic support according to claim 17 wherein the locking device includes a tube secured to the collar in order to slideably receive the rod, with the cam movable relative to the tube, with the cam pivotally mounted to the collar about a pivot axis, with the rod being slideable in a slide direction parallel to and spaced from the pivot axis.

19. The telescopic support according to claim 18 wherein the locking device includes a handle connected with the rod generally perpendicular to the slide direction.

20. The telescopic support according to claim 19 wherein the tube defines a slot through which the handle extends, and wherein the rod defines a hole for receiving a tip of the handle, with the handle abutting with the slot for preventing removal of the rod from the tube.

* * * * *